US011074050B2

United States Patent
Anicic et al.

(10) Patent No.: US 11,074,050 B2
(45) Date of Patent: Jul. 27, 2021

(54) COMPOSING AN APPLICATION USING A PLURALITY OF DISTRIBUTED INTERACTION PATTERNS

(71) Applicant: SIEMENS AKTIENGESELLSCHAFT, Munich (DE)

(72) Inventors: Darko Anicic, Munich (DE); Aparna Saisree Thuluva, Munich (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 83 days.

(21) Appl. No.: 16/349,549

(22) PCT Filed: Nov. 14, 2016

(86) PCT No.: PCT/EP2016/077543
§ 371 (c)(1),
(2) Date: May 13, 2019

(87) PCT Pub. No.: WO2018/086711
PCT Pub. Date: May 17, 2018

(65) Prior Publication Data
US 2019/0286426 A1 Sep. 19, 2019

(51) Int. Cl.
*G06F 8/35* (2018.01)
*G06F 8/36* (2018.01)
(52) U.S. Cl.
CPC . *G06F 8/35* (2013.01); *G06F 8/36* (2013.01)
(58) Field of Classification Search
None
See application file for complete search history.

(56) References Cited

U.S. PATENT DOCUMENTS 8,417,658 B2 * 4/2013 Arnold ............... G06N 5/02
706/48
10,262,019 B1 * 4/2019 Reiner ............... G06F 9/5077
(Continued)

FOREIGN PATENT DOCUMENTS

WO WO-2016128415 A1 * 8/2016 ....... G06F 16/24578

OTHER PUBLICATIONS

Ara, Safina Showkat, et al. "Web-of-objects based user-centric semantic service composition methodology in the internet of things." International Journal of Distributed Sensor Networks 10.5 (2014): 482873.
(Continued)

*Primary Examiner* — Marina Lee
(74) *Attorney, Agent, or Firm* — Lempia Summerfield Katz LLC (57) ABSTRACT

The present invention relates to a method for composing an application using a plurality of distributed interaction patterns including services, events, actions and properties. A second semantic model or Thing Recipe is provided as a basis for representing the application. This Thing Recipe provides a concept for orchestration or choreography of interaction patterns distributed across a network. The process from a specification of the Thing Recipe to its deployment is considerable shorter than the implementation and orchestration of web service. The Thing Recipe is not only interpretable but also executable. The semantic approach of the Thing Recipe enables a formal representation capable of a machine-based discovery of the application functionality and, at the same time, a machine interpretation and execution. This means that a Thing Recipe can be directly executed in any device that has an embedded runtime with reasoning capabilities.

15 Claims, 4 Drawing Sheets

(56) References Cited

U.S. PATENT DOCUMENTS

| | | | | |
|---|---|---|---|---|
| 2006/0074980 A1* | 4/2006 | Sarkar | ............... | G06F 16/958 |
| 2013/0332897 A1* | 12/2013 | Dim | ............... | G06F 8/35 |
| | | | | 717/104 |
| 2014/0310306 A1* | 10/2014 | Sawczuk | ............ | G06F 16/3344 |
| | | | | 707/769 |
| 2015/0019462 A1* | 1/2015 | De | ............... | G06N 5/04 |
| | | | | 706/11 |

OTHER PUBLICATIONS

Meyer, Sonja, et al. "Internet of things-aware process modeling: integrating IoT devices as business process resources." International conference on advanced information systems engineering. Springer, Berlin, Heidelberg, 2013. pp. 84-98.

PCT International Search Report and Written Opinion of International Searching Authority dated Feb. 22, 2017 corresponding to PCT International Application No. PCT/EP2016/077543 filed on Nov. 14, 2016.

Robles, Tomás, et al. "An IoT based reference architecture for smart water management processes." JoWUA 6.1 (2015): 4-23.

Bröring, Arne, Soumya Kanti Datta, and Christian Bonnet. "A categorization of discovery technologies for the internet of things." Proceedings of the 6th International Conference on the Internet of Things. Nov. 2016. pp. 131-139.

European Office Action for European Application No. 16 797 505.1—1224 dated Jun. 1, 2021.

* cited by examiner

T2TI_1: T2T Interaction 1
T2TI_2: T2T Interaction 2

COMPOSING AN APPLICATION USING A PLURALITY OF DISTRIBUTED INTERACTION PATTERNS

This application is the National Stage of International Application No. PCT/EP2016/077543, filed Nov. 14, 2016. The entire contents of this document are hereby incorporated herein by reference.

TECHNICAL FIELD

The disclosed embodiments relate to composing an application using a plurality of distributed interaction patterns, and representing, discovering, and executing the application.

BACKGROUND

A system of physical objects that may be discovered, monitored, controlled, or interacted with by electronic devices that communicate over various networking interfaces is commonly referred to as »Web of Things«.

In the industrial domain, specifically in the field of automation facilities, Web of Things techniques are believed to launch a revolutionary concept that is frequently referred to as »Industry 4.0«.

According to the Web of Things concept, devices or »Things« are connected to a web and are autonomously able to extend or update functionality by installing a piece of software. Since automation facilities are inevitably more complex than general »things«, the term »Web of Systems« for denoting automation facilities is preferred over the common »Web of Things« paradigm.

The Web of Things approaches are developed for enabling physical objects or Things to be part of the network or World Wide Web with the consequence that these Things are accessible over the network in a similar fashion as web pages are accessible on the World Wide Web today. Moreover, Things are designed to interact with each other using commonly known web standards.

Current methods for composing an application using a plurality of distributed Things are commonly built by letting Things interact in a certain way.

However, the deployment of such applications is time-consuming, cumbersome, and not least limited with respect to flexibility. As an example, when applying a known Service Oriented Architecture or SOA, functionalities of services are exposed in a network. An application for orchestrating and choreographing such services is then realized by putting these loosely coupled services into cooperation. The development of such complex applications, however, requires expert knowledge and special development skills of the specific service environment and programming skills of the computer architecture (e.g., embedded or PLC-specific programming), and is limited to the particular environment. Consequently, re-usability of such applications in alternative environments is almost impossible.

SUMMARY AND DESCRIPTION

There is a need in the art for defining and implementing an application that is a composition of a plurality of distributed interaction patterns offered by Things.

There is also a need in the art for implementing a capability of exporting or reusing existing applications in alternative environments.

There is a need in the art for discovering applications and interpreting contents of the applications in order to acquire a basis for a decision of whether an application is useful in a specific environment.

One or more of the present embodiments relate to a method for composing an application using a plurality of distributed interaction patterns assigned to at least one device and accessible over a network. The method includes a) using at least one first semantic model or »Thing Description«. Each first semantic model of the at least one first semantic model semantically represents interaction patterns of the device. The method also includes b) providing a second semantic model or »Thing Recipe«. The second semantic model formalizes composed interactions by semantically describing interaction pattern types. The interaction patterns types are an instance of at least one of the interaction patterns. The method includes c) implementing the second semantic model by instantiating a network resource identifier to each interaction pattern, and d) deploying the second semantic model within one of the devices.

According to one or more of the present embodiments, a semantic representation (e.g., the second semantic model or »Thing Recipe«) is provided as a basis for representing the application.

This Thing Recipe provides a concept for orchestration or choreography of interaction patterns distributed across a network.

The process from a specification of the Thing Recipe to a deployment is considerably shorter than the implementation and orchestration of web service. Advantageously, the implementation of a Thing Recipe does not require special development skills as in the orchestration of web service. Rather, the implementation of a Thing Recipe in order to run an application in an automated system is similar to the development of a web application.

The Thing Recipe is not only interpretable but also executable. The semantic approach of the Thing Recipe enables a formal representation capable of a machine-based discovery of the application functionality and, at the same time, a machine interpretation and execution. This provides that a Thing Recipe may be directly executed in any device that has an embedded runtime with reasoning capabilities.

Advantageously, the contents of the Thing Recipe and the Thing Descriptions used by the Thing Recipe are semantically described such that machines or other devices are able to understand and interpret the semantics in order to autonomously allocate appropriate automation resources.

DETAILED DESCRIPTION

Within the concept of Web of Things, functionalities and interactions of devices (also referred to as »Things« in order to emphasize the distributed nature) are semantically represented. Semantic representations of a Thing are called Interaction Patterns, as one may interact with a Thing throughout the Interaction Patterns (e.g., to read a Property of a Thing, to trigger Actions of the Thing, or to consume an Event raised by the Thing).

For example, Thing Description (TD) proposed by the Web of Things (WoT) group of the World Wide Web Consortium (W3C) is a representation that may be used for this purpose. Thing Description provides a model for a device, including sensors, actuators, controllers etc., in terms of corresponding metadata and properties, as well as events raised by the device or actions that may be triggered by the device.

Hereinafter, embodiments are illustrated by an exemplary embodiment. According to this exemplary embodiment, an automation system depicted in FIG. 1 is to be amended by a new application, which may be based on reusing existing functionality provided by distributed automation devices within the automation system.

Figure 1:
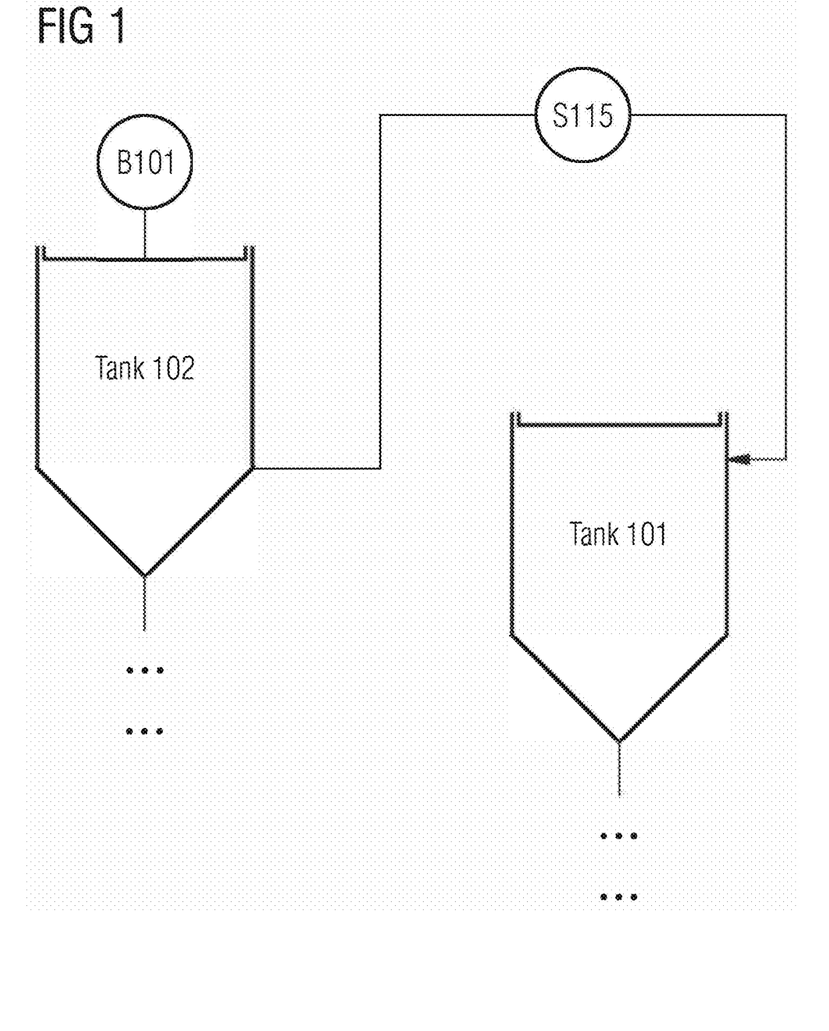
FIG. 1 shows a block diagram of an exemplary application according to an embodiment.

Referring to FIG. 1, the exemplary automation system—includes, among other entities, two liquid tanks T101, T102, an ultrasonic sensor B101, and a pneumatic valve S115. Liquid may circulate between the second tank T102 and the first tank T101 effected by further entities (e.g., a pump). The sensor B101 measures the level of liquid in the second tank T102. If the level exceeds the threshold predefined for the second tank T102, the pneumatic valve S115 may open for feeding liquid to Tank 101.

This exemplary scenario is typical in process automation systems and frequently reoccurs in various applications. A process engineer may, therefore, wish to apply a kind of template in order to instantiate this application »patterm« rather than implementing this application from the scratch.

Turning back to the example of FIG. 1, the ultrasonic sensor B101 is characterized by the following interaction patterns: A property »tankLiquidLevel« that gives information on the current liquid level, and an Event »overflow-Event that is an alert raised when the current liquid level exceeds an adjustable maximum.

Such and other interaction patterns are defined on an atomic and composable functionality level and provided by a Thing Description of a device, as shown below.

A complete thing description of the ultrasonic sensor B101 is shown below:

```
{
  "@context": ["https://w3c.github.io/wot/w3c-wot-td-context.jsonld",
       "http://www.example.com/common-context.jsonld",
           "http://www.example.com/interactions-
                context.jsonld"],
  "name" : "MyUltrasonicSensorB101",
  "@type" : ["sensor", "ultrasonicSensor"],
  "uris" : ["coap://192.0.0.2:5683/ultrasonicSensor",
       "http:// 192.0.0.2:8080/ultrasonicSensor"],
  "encodings": ["JSON"],
  "onPlatform": "Tank102",
  "properties": [
    {
      "@id": "level",
      "@type": "tankLiquidLevelProperty",
      "name": "tankLiquidLevel",
      "valueType": {"type": "float"},
      "writable":"false",
      "unit": {"@type":"cm"},
      "hrefs": ["tankLiquidLevel"]
    }
  ],
  "events": [
```

```
    {
      "name": "overflowEvent",
      "@type": "overflowEvent",
      "valueType": { "type": "float"},
      "property": "level",
      "hrefs": ["overflowEvent"]
    }
  ]
}
```

A complete thing description of the pneumatic valve S115 is shown below:

```
{
  "@context": ["https://w3c.github.io/wot/w3c-wot-td-context.jsonld",
       "http://www.example.com/common-context.jsonld",
           "http://www.example.com/interactions-
                context.jsonld"],
  "name": "PneumaticValveS115",
  "@type":["dogont:OnOffSwitch",
  "pneumaticDirectionalControlValve"],
  "uris" : ["coap:// 192.0.0.3:5683/pneumaticValve",
       "http:// 192.0.0.3:8080/pneumaticValve"],
  "encodings": ["JSON"],
  "onPlatform": ["Tank102","Tank101"],
  "properties": [
    {
      "@id": "pneumaticValveStatus",
      "@type": "pneumaticValveOpenStatusProperty",
      "name": "pneumaticValveOpenStatus",
      "valueType": {"type": "boolean"},
      "writable":"false",
      "hrefs": ["pneumaticValveOpenStatus"]
    }
  ],
  "actions": [
    {
      "name": "openPneumaticValve",
      "@type":"openPneumaticValveAction",
      "inputData": {
        "@type": "dogont:OnOffState",
        "valueType": {"type": "boolean"}
      },
      "property": "pneumaticValveStatus",
      "hrefs": ["openPneumaticValve"]
    }
  ]
}
```

Apart from Interaction Patterns, both Thing Descriptions shown above further describe contextual information (e.g., the sensor is attached to Tank 102), data types produced and consumed by a Thing (e.g., float), serialization formats of the data (e.g., JSON), information on supported protocols by the Thing (e.g., CoAP, HTTP etc.), URIs (Uniform Resource Identifiers) of Thing's Interaction Patterns (e.g., coap://192.0.0.2:5683/ultrasonicSensor/tankLiquidLevel), etc.

JSON or JavaScript Object Notation is an open-standard format that uses human-readable text to transmit data objects consisting of attribute-value pairs. Constrained Application Protocol (CoAP) is an Internet Application Protocol for constrained devices. This enables constrained devices to communicate with the wider Internet using similar protocols.

The Thing Descriptions shown above have been specified with additional semantic metadata. For example, the device is defined as a sensor. This is, for example, an »ultrasonicSensor« defined with as class
    eclass:C_AKE655002-tax
referring to a definition of a common context. The definition of the common context itself is not shown in this specification.

The definition of the »ultrasonicSensor« shown above refers to a specification entitled »eCl@ss«, which is a cross-industry product data standard for classification and description of products.

The measuring unit the data provided by the Property »tankLiquidLevel« is defined to be centimetre:

"unit": {"@type":"cm"}

This definition refers to a QUDT ontology (»Quantities, Units, Dimensions and Data Types«) that is also included in the common context:

"cm": "qu:centimetre"

An action »openPneumaticValve« is of type »pneumaticDirectionalControlValve«, which is defined as an eCl@ss class »C_AKE779002-tax« in the common context (not shown).

Further details on Thing Description are available at the W3C documentation related to Thing Description.

The use of Thing Description according to this embodiment provides a capable model for representing Things in a »Thing Recipe«. For a characterization of Things, other models may be applied, which provides that the concept of the »Thing Recipe« is not limited in this respect.

Using both Thing Descriptions or »first« semantic models shown above, a further »second« semantic model or Thing Recipe is described in the following. This Thing Recipe allows for a composition of an application by orchestrating interactions of the devices B101, S115 and saving this interaction in a template for a later usage, amendment, sharing, or composition with other templates.

The Thing Recipe aims to formalize interactions between Things. The Thing Recipe optionally aims to specify configuration attributes for at least one interaction pattern as required by an application and to optionally enable definition of non-functional properties (NFPs) and Quality of Service (QoS) parameters.

Figure 2:
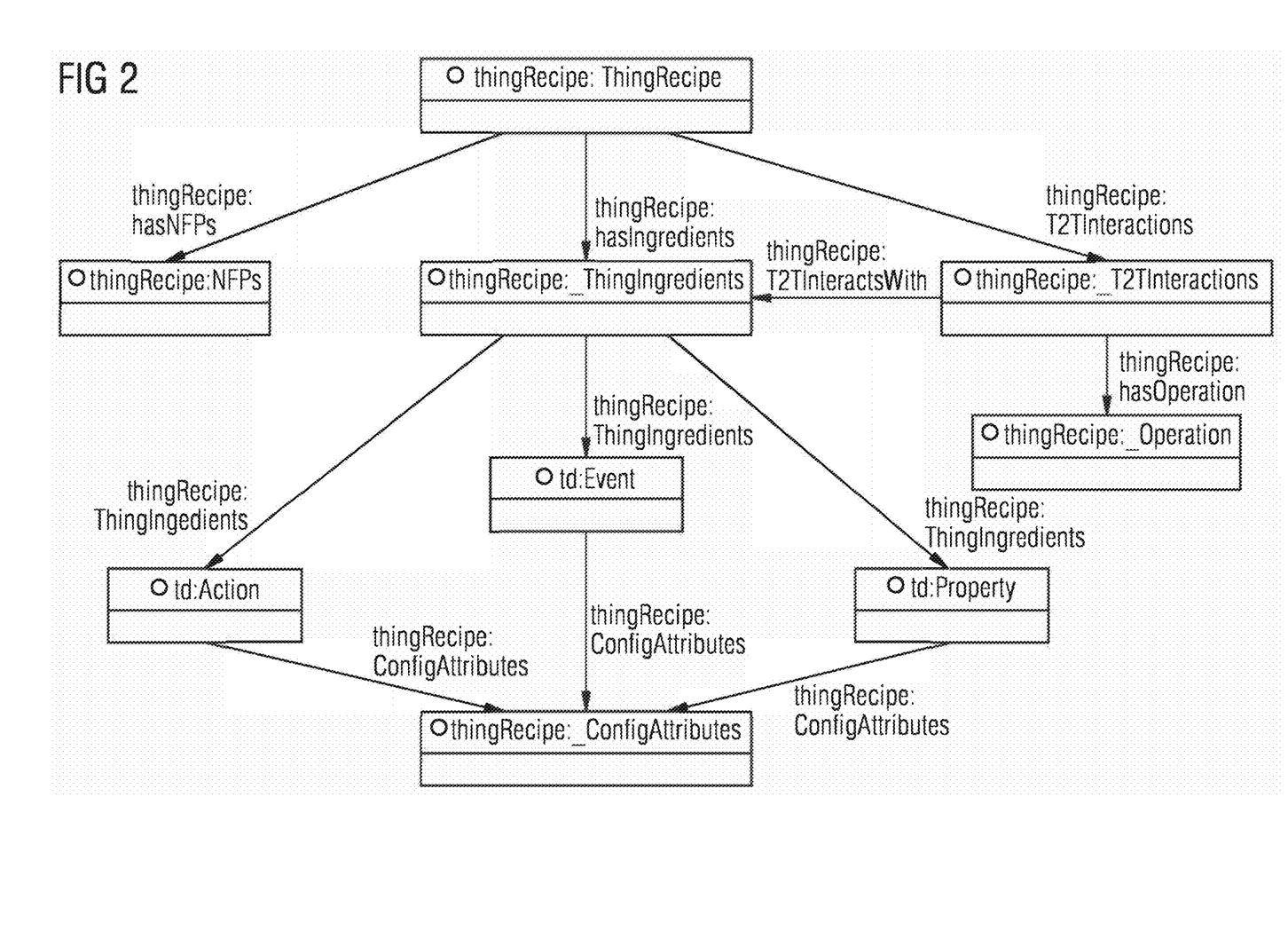
FIG. 2 shows a block diagram of a Thing Recipe according to an embodiment.

These three aspects of a »Thing Recipe« are depicted in FIG. 2, which shows a Thing Recipe model and the relation to Thing Descriptions.

The Thing Recipe model has »ThingIngredients« for which Thing-to-Thing interactions or »T2TInteractions« are defined.

ThingIngredients gather all interaction offerings of Things that may be expressed in terms of Properties, Actions, and Events. The Thing Recipe model further specifies configuration attributes »ConfigAttributes«, as required by the application. Thus, for each Thing Recipe, a user knows which configuration options to be set.

Optionally, non-functional properties or »NFPs« for a Thing Recipe are defined. According to the model, NFPs may be defined for each Property, Action, and Events of a Thing (e.g., directly in the Thing Description). In this respect, with no limitation, additional relations in FIG. 2 may be established between NFPs on the one side, and Properties, Actions, and Events on the other side.

A complete Thing Recipe Model according to FIG. 2 is provided below:

```
# baseURI: http://example.org/thingRecipeModel
# imports: http://www.w3c.org/wot/td
# prefix: thingRecipe
@prefix owl: <http://www.w3.org/2002/07/owl#> .
@prefix rdf: <http://www.w3.org/1999/02/22-rdf-syntax-ns#> .
@prefix rdfs: <http://www.w3.org/2000/01/rdf-schema#> .
@prefix td: <http://www.w3c.org/wot/td#> .
@prefix thingRecipe: <http://example.org/thingRecipeModel#> .
@prefix xsd: <http://www.w3.org/2001/XMLSchema#> .
<http://example.org/thingRecipeModel>
```

-continued

```
  rdf:type owl:Ontology ;
  owl:imports <http://www.w3c.org/wot/td> ;
  owl:versionInfo "Created with TopBraid Composer"^^xsd:string ;
.
thingRecipe:ConfigAttributes
  rdf:type owl:ObjectProperty ;
  rdfs:domain [
    rdf:type owl:Class ;
    owl:unionOf (
      td:Event
      td:Action
      td:Property
    ) ;
  ] ;
  rdfs:range thingRecipe:_ConfigAttributes ;
.
thingRecipe:Create
  rdf:type thingRecipe:_Operation ;
.
thingRecipe:Delete
  rdf:type thingRecipe:_Operation ;
.
thingRecipe:NFPs
  rdf:type owl:Class ;
  rdfs:subClassOf owl:Thing ;
.
thingRecipe:Notify
  rdf:type thingRecipe:_Operation ;
.
thingRecipe:Observe
  rdf:type thingRecipe:_Operation ;
.
thingRecipe:Retrieve
  rdf:type thingRecipe:_Operation ;
.
thingRecipe:T2TInteractions
  rdf:type owl:ObjectProperty ;
  rdfs:domain thingRecipe:ThingRecipe ;
  rdfs:range thingRecipe:_T2TInteractions ;
.
thingRecipe:T2TInteractsWith
  rdf:type owl:ObjectProperty ;
  rdfs:domain thingRecipe:_T2TInteractions ;
  rdfs:range thingRecipe:_ThingIngredients ;
.
thingRecipe:ThingIngredients
  rdf:type rdf:Property ;
  rdfs:domain thingRecipe:_ThingIngredients ;
  rdfs:range [
    rdf:type owl:Class ;
    owl:unionOf (
      td:Action
      td:Event
      td:Property
    ) ;
  ] ;
.
thingRecipe:ThingRecipe
  rdf:type owl:Class ;
  rdfs:subClassOf owl:Thing ;
.
thingRecipe:Update
  rdf:type thingRecipe:_Operadon ;
.
thingRecipe:Variable
  rdf:type owl:Class ;
  rdfs:subClassOf owl:Thing ;
.
thingRecipe:_ConfigAttributes
  rdf:type owl:Class ;
  rdfs:subClassOf owl:Thing ;
.
thingRecipe:_Operation
  rdf:type owl:Class ;
  rdfs:subClassOf owl:Thing ;
  owl:equivalentClass [
    rdf:type owl:Class ;
    owl:intersectionOf (
      thingRecipe:_Operation
```

```
[
  rdf:type owl:Class ;
  owl:oneOf (
    thingRecipe:Create
    thingRecipe:Delete
    thingRecipe:Notify
    thingRecipe:Observe
    thingRecipe:Retrieve
    thingRecipe:Update
  ) ;
]
) ;
] ;
.
thingRecipe:_T2TInteraction
  rdf:type owl:Class ;
  rdfs:subClassOf owl:Thing ;
.
thingRecipe:_T2TInteractions
  rdf:type owl:Class ;
  rdfs:subClassOf owl:Thing ;
.
thingRecipe:_ThingIngredients
  rdf:type owl:Class ;
  rdfs:subClassOf owl:Thing ;
.
thingRecipe:hasIngredients
  rdf:type owl:ObjectProperty ;
  rdfs:domain thingRecipe:ThingRecipe ;
  rdfs:range thingRecipe:_ThingIngredients ;
.
thingRecipe:hasNFPs
  rdf:type owl:ObjectProperty ;
  rdfs:domain thingRecipe:ThingRecipe ;
  rdfs:range thingRecipe:NFPs ;
.
thingRecipe:hasOperation
  rdf:type owl:ObjectProperty ;
  rdfs:domain thingRecipe:_T2TInteractions ;
  rdfs:range thingRecipe:_Operation ;
.
thingRecipe:thingRecipeInstUri
  rdf:type owl:DatatypeProperty ;
  rdfs:range xsd:anyURI ;
.
thingRecipe:thingRecipeUri
  rdf:type owl: DatatypeProperty ;
  rdfs:range xsd:anyURI ;
.
```

Thing Recipe Model represented above is defined in an RDF Turtle format as proposed by the Web of Things (WoT) group of the World Wide Web Consortium (W3C). The Thing Recipe model is used for creating a Thing Recipe.

In the following, an exemplary Thing Recipe, or more specifically an Overflow Protection Thing Recipe for the example application depicted in FIG. 1 is shown:

```
{
  "@context" : ["https://w3c.github.io/wot/w3c-wot-td-context.jsonld",
                "http://www.example.com/common-context.jsonld",
                "http://www.example.com/ThingRecipeModel.jsonld",
                "http://www.example.com/interactions-context.jsonld"
  ],
  "name": "overflowProtectionServiceRecipe",
  "@type" : ["protectionService","industryAutomation"],
  "recipeId": ["http://example.org/services/overflowProtectionServiceRecipe",
               "coap://example.org/services/overflowProtectionServiceRecipe"],
  "hasIngredients" : [
    {
      "ThingIngredients" : [
        {
          "@type" : "overflowEvent"
        }]
    },
    {
      "ThingIngredients" : [
        {
          "@type" : "pneumaticValveOpenStatusProperty"
        },
        {
          "@type": "openPneumaticValveAction",
          "ConfigAttributes":[
            {
              "inputData": {
                "@type": "dogont:OnOffState",
                "valueType": {"type": "boolean"}
              }
            }
          ]
        }
      ]
    }
  ],
  "T2TInteractions":[
    {
      "T2TInteractsWith":[
        {"@type" : "overflowEvent",
         "hasOperation" : "Retrieve"
        },
        {"@type" : "openPneumaticValveAction",
         "hasOperation" : "Update"
        }
      ]
    },
    {
```

```
        "T2TInteractsWith":[
            {"@type" : "pneumaticValveOpenStatusProperty",
             "hasOperation" : "Retrieve"
             },
            {"@type": "openPneumaticValveAction",
             "hasOperation" : "Update"
                    }]
        }
],
"NFPs":[
{
  "variable" : "X",
  "@type":"onPlatform"
}]
}
```

The Overflow Protection Thing Recipe has three Thing-Ingredients: »overflowEvent«, »openPneumaticValveAction«, and »pneumaticValveOpenStatusProperty«. The latter two ingredients are grouped together, identifying that these two ingredients belong to the same Thing.

Configuration attributes or »ConfigAttributes« are specified for »openPneumaticValveAction«. The ingredient has one input data, which is relevant for this recipe. It is a Boolean data, defined as »OnOffState« in DogOnt, which is an ontology for modelling building automation environments.

The recipe has two »T2TInteractions«, one from »overflowEvent« to »openPneumaticValveAction«, and another from »pneumaticValveOpenStatusProperty« to »openPneumaticValveAction«.

In T2TInteractions, ThingRecipe not only specifies the interaction between interaction pattern types but also specifies the type of operation to be performed on each interaction pattern type inside the Recipe. For example, in »OverflowProtectionRecipe«, there are »T2TInteractions« between »overflowEvent« and »openPneumaticValveActiom« that specify Retrieve the value of the Event »overflowEvent« and Update the Action »openPneumaticValve«.

Non-functional properties (NFPs) and quality of service (QoS) parameters are specified in the block called »NFPs« of the Overflow Protection Thing Recipe. In the Overflow Protection Thing Recipe shown above, there is one placeholder for a property »onPlatform«, which enables the specification of a platform on which the recipe should be implanted. In other words, this non-functional property refers to a deployment context.

Examples of other commonly used NFPs and QoS include price specification, availability, access rights, security, quality, etc. Existing vocabularies for NFPs and QoS may be imported in the common vocabulary similarly, as included in the property »onPlatform« from Semantic Sensor Network ontology, and may be used directly when creating Thing Recipes.

Each ingredient may have NFPs and QoS defined separately for itself. The purpose of the »NFPs« block is, however, to define properties that are valid for the recipe as a whole. For example, specification of the price in a recipe does not account for the price of a specific ingredient in the recipe, but for the total price of all its ingredients.

The JSON-LD context at the beginning of the Overflow Protection Thing Recipe:

```
"@context" : ["https://w3c.github.io/wot/w3c-wot-td-context.jsonld",
    "http://www.example.com/common-context.jsonld",
    "http://www.example.com/ThingRecipeModel.jsonld",
    "http://www.example.com/interactions-context.jsonld"
``` shows that the specification of the Overflow Protection Thing Recipe is based on following: A Thing Description as a basis for description of Things involved in the Thing Recipe; the Thing Recipe Model according to FIG. 2 as a vocabulary used to specify the Thing Recipe; a common context as a vocabulary used to enrich contextual information in the Thing Recipe; an interaction context as vocabulary used to declare »ThingIngredients« in the Thing Recipe. An interaction context is shown below:

```
{
    "@context": {
            "tankLiquidLevelProperty":
                {
                "@id": "http://www.example.com/interactions/tankLiquidLevelProperty",
                    "@type": "@id"
                },
            "pneumaticValveOpenStatusProperty":
                {
                "@id": "http://www.example.com/interactions/pneumaticValveOpenStatusProperty",
                    "@type": "@id"
                },
            "overflowEvent":
                {
                "@id": "http://www.example.com/interactions/overflowEvent",
                    "@type": "@id"
                },
            "openPneumaticValveAction":
                {
```

```
          "@id": "http://www.example.com/interactions/openPneumaticValveAction",
             "@type": "@id"
             }
          }
}
```

Figure 3:
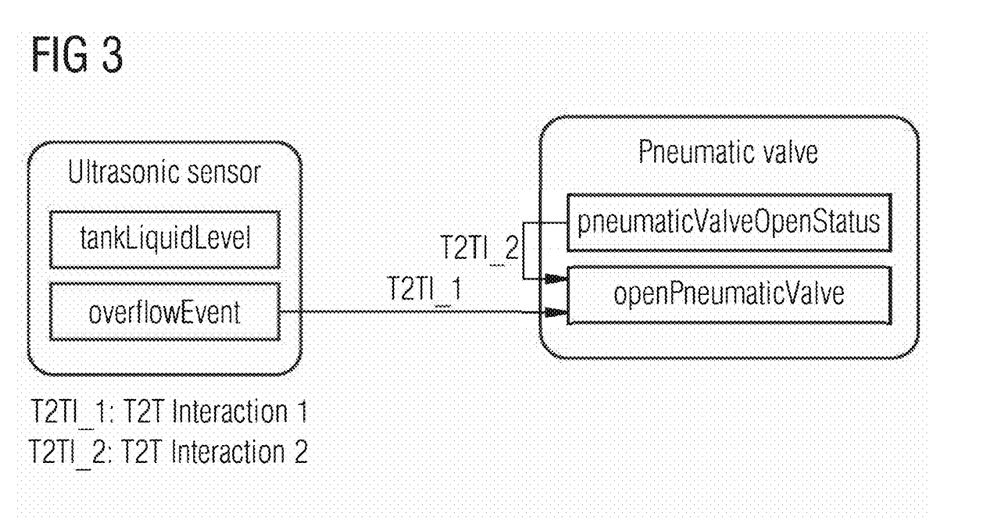
FIG. 3 shows a graphical representation of exemplary Thing-to-Thing-Interactions in an exemplary Thing Recipe.

FIG. 3 depicts a graphical representation of T2TInteractions in the Overflow Protection Thing Recipe. A first interaction T2TI_1 couples the overflowEvent with the action openPneumaticValve, and a second interaction T2TI_2 couples the pneumaticValveOpenStatus with the action openPneumaticValve.

The Overflow Protection Thing Recipe includes three ingredients. These ingredients have been defined in terms of Interaction Patterns in the Thing Description model shown above. Thus, these ingredients may be categorized as Properties, Actions, and Events according to FIG. 4. The Interaction Patterns of FIG. 4 include the properties tankLiquidLevelProperty and pneumaticValveOpenStatus. The Interaction Patterns of FIG. 4 further include the action openPneumaticValveAction and the event overflowEvent.

A complete semantics for the ingredients based on the common context is defined in the following Interaction Pattern Types:

The Interaction Patterns described in the respective Thing Descriptions are instances of the Interaction Pattern Types defined above. The motivation for this lies in the following: Semantic descriptions of ingredients (e.g., types of Events, Properties, and Actions) may be specified once and later on reused when creating the Thing Recipe.

With the approach of Interaction Pattern Types, recipes with potentially existing types of Events, Properties, and Actions are already built and hence enhance interoperability. The interaction pattern types are, in other words, an instance of at least one of the interaction patterns.

This is important as the types of Events, Properties, and Actions are in large extent already standardized as product features. A classification entitled »eCl@ss«, for example, provides a cross-industry product data standard for classification and description of products.

Using the approach of Interaction Pattern Types, an implementation of a recipe will be easier to match with

```
{
    "@context": ["https://w3c.github.io/wot/w3c-wot-td-context.jsonld",
                 "http://www.example.com/common-context.jsonld",
                 "http://www.example.com/interactions-context.jsonld"
    ],
    "uris" : ["coap://www.example.com/interactions",
              "http://www.example.com/interactions"],
  "tankLiquidLevelProperty":
        {
           "name": "tankLiquidLevelProperty",
           "@type": ["Property", "LiquidLevel", "ultrasonicSensor"],
           "valueType": {"type": "float"},
           "writable":"false",
           "hrefs": ["tankLiquidLevelProperty"]
        },
  "pneumaticValveOpenStatusProperty":
        {
           "@type": ["Property", "DeviceStatus", "pneumaticDirectionalControlValve"],
                "valueType": {"type": "boolean"},
                "writable":"false",
           "hrefs": ["pneumaticValveOpenStatusProperty"]
        },
  "overflowEvent":
        {
           "@type" : ["Event", "LiquidLevel", "max", "ultrasonicSensor"],
           "valueType": {"type": "float"},
           "hrefs": ["overflowEvent"]
        },
    "openPneumaticValveAction":
        {
         "@type":["Action", "dogont:ToggleCommand", "pneumaticDirectionalControlValve"],
         "inputData": {
             "@type": "dogont:OnOffState",
             "valueType": {"type": "boolean"}
           },
         "hrefs": ["openPneumaticValveAction"]
        }
}
``` respect to existing features exposed by Things, or to replace Things in running recipe instances.

Up to now, the following acts for composing the application have been described: a) using at least one first semantic model or »Thing Description« for semantically representing interaction patterns of the devices; and b) providing a second semantic model or »Thing Recipe« for formalizing composed interactions by semantically describing interaction pattern types, which are an instance of at least one of the interaction patterns.

In the following, the act of c) implementing the second semantic model by instantiating a network resource identifier to each interaction pattern according to an embodiment of the invention is described.

As to the implementation of the Thing Recipe, network resource identifiers are instantiated to each interaction pattern. This provides that »ThingIngredients« and »T2TInteractions« are instantiated with particular Uniform Resource Identifiers or URI from selected Things and their Interaction Patterns.

For the example Overflow Protection Recipe, an instance is provided by the following Overflow Protection Recipe Instance:

```
{
    "@context" : ["https://w3c.github.io/wot/w3c-wot-td-context.jsonld",
                "http://example.com/rulevocabulary.jsonld",
                    "http://www.example.com/common-context.jsonld",
                    "http://www.example.com/ThingRecipeModel.jsonld"
                ],
    "name": "overflowProtectionServiceRecipeInstance",
    "recipeId": ["http://example.org/services/overflowProtectionServiceRecipe",
                "coap://example.org/services/overflowProtectionServiceRecipe"],
    "recipeInstId":
["http://example.org/services/overflowProtectionServiceRecipeInstanceNew",
                "coap://example.org/services/overflowProtectionServiceRecipeInstanceNew"],
    "hasIngredients" : [
    {
      "ThingIngredients" : [
      {
            "@type" : "Event",
                "hrefs": ["coap://192.0.0.2:5683/ultrasonicSensor/overflowEvent"]
      }
      ]
    },
    {
    "ThingIngredients" : [
    {
        "@type" : "Property",
        "hrefs": ["coap://www.example.com/192.0.0.3:5683/pneumaticValveOpenStatus"]
    },
    {
      "@type" : "Action",
      "hrefs": ["coap:// 192.0.0.3:5683/pneumaticValve/openPneumaticValve"]
    }
    ]
    }
    ],
    "T2TInteractions":[
        {
            "T2TInteractsWith":[
            {"hrefs": ["coap:// 192.0.0.2:5683/ultrasonicSensor/overflowEvent"],
                "hasOperation" : "Retrieve"
                },
                {"hrefs": ["coap://www.example.com/192.0.0.3:5683/openPneumaticValve"],
                "hasOperation" : "Update"
                }]
        },
        {
            "T2TInteractsWith":[
                {"hrefs": ["coap://www.example.com/192.0.0.3:5683/pneumaticValveOpenStatus"],
                    "hasOperation" : "Retrieve"
                    },
                    {"hrefs": ["coap:// 192.0.0.3:5683/pneumaticValve/openPneumaticValve"],
                    "hasOperation" : "Update"
                    }]
        }
    ],
    "NFPs":[
    {
      "onPlatform" : "Tank102"
    }]}
```

Figure 5:
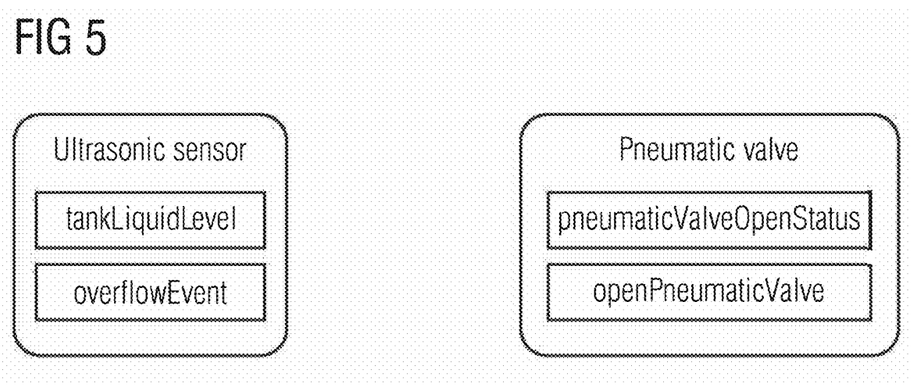
FIG. 5 shows a graphical representation of exemplary Things required in an exemplary Thing Recipe.
Figure 6:
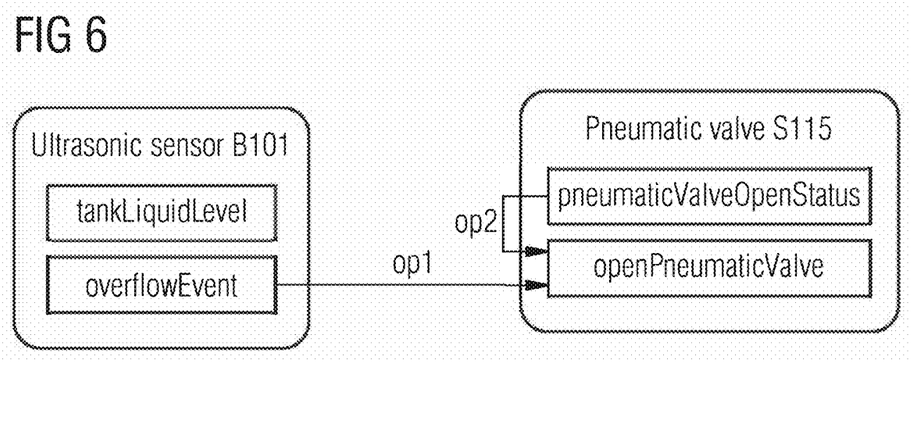
FIG. 6 shows a graphical representation of an implemented Thing Recipe.

Illustratively speaking, in this process, FIG. 3 and FIG. 5 are merged to produce an outcome shown in FIG. 6. For the ultrasonic sensor B101 and the pneumatic valve S115, respective Things have been selected, respectively. URIs of corresponding Interaction Patterns are known from corresponding Thing Descriptions. Thus, it is easy to automatically instantiate the interactions op1 and op2 according to FIG. 6: Instantiation of Interaction op1:

Thing Recipe with corresponding semantics provides other possibilities, too. For example, a recipe instance may be saved for documentation purposes. Such documentation is fully machine interpretable. A user or a machine may utilize semantic search and semantic reasoning to discover recipe instances, Things, and interactions between them in an automated fashion.

```
"T2TInteractsWith":[
    {"hrefs": ["coap:// 192.0.0.2:5683/ultrasonicSensor/overflowEvent"],
"hasOperation" : "Retrieve"},
    {"hrefs": ["coap://www.example.com/192.0.0.3:5683/openPneumaticValve"],
"hasOperation" : "Update"}]
Instantiation of Interaction op2:
"T2TInteractsWith":[
        {"hrefs": ["coap://www.example.com/192.0.0.3:5683/pneumaticValveOpenStatus"],
"hasOperation" : "Retrieve"},
        {"hrefs": ["coap://www.example.com/192.0.0.3:5683/openPneumaticValve"],
"hasOperation" : "Update"}]
```

Thing Description standardizes the way the access and manipulation of corresponding Interaction Patterns shall are to be done. For example, when using CoAP, a TD Property (Thing Description according to W3C) may be read with a For example, the following query may be used to find out Things that are used in a running Thing Recipe instance, or, in other words, for retrieving the Thing Descriptions from a Thing Recipe instance:

```
prefix td:   <http://www.w3c.org/wot/td#>
prefix trm: <http://example.org/thingRecipeModel#>
prefix interactions: <http://www.example.com/interactions#>
DESCRIBE ?td1 ?td2
WHERE {
    ?recipeInst trm:thingRecipeInstUri
<http://example.org/services/overflowProtectionServiceRecipeInstanceNew>.
        ?recipeInst trm:hasIngredients ?ingredients .
        ?ingredients trm:ThingIngredients ?_b_1 .
        ?_b_1 a td:hasEvent .
        ?_b_1 td:associatedUri ?_uri1 .
        ?td1 td:hasEvent ?_b_3 .
        ?_b_3 td:associatedUri ?_uri1 .
        ?recipeInst trm:hasIngredients ?ingredients1 .
        ?ingredients1 trm: ThingIngredients ?_b_2 .
        ?_b_2 a td:hasProperty .
        ?_b_2 td:associatedUri ?_uri2 .
        ?td2 td:hasProperty ?_b_4 .
        ?_b_4 td:associatedUri ?_uri2 .
        ?ingredients1 trm:ThingIngredients ?_b_5 .
        ?_b_5 a td:hasAction .
        ?_b_5 td:associatedUri ?_uri3 .
        ?td2 td:hasAction ?_b_6 .
        ?_b_6 td:associatedUri ?_uri3 .
}
```

GET command and written with a PUT command, an action may be invoked with PUT, etc.

The data of the payload, when calling certain operations, is also described in the Thing Description. Thus, all machine interpretable information is in place to let the Things establishing op1 and op2 in an automated fashion. This is possible thanks to the specification of the Thing Recipe and Thing Descriptions to be provided for implementation.

This exemplary query uses SPARQL (»SPARQL Protocol And RDF Query Language«), a semantic query language for databases.

Retrieved Thing Descriptions returned by such a query may be used, for example, if existing or possibly malfunctioning Things are to be replaced with newer or cheaper Things.

Up to now, the following acts for composing the application have been described: a) using at least one first semantic model or »Thing Description for semantically representing interaction patterns of the devices; b) providing a second semantic model or »Thing Recipe« for formalizing composed interactions by semantically describing interaction pattern types, which are an instance of at least one of the interaction patterns; and c) implementing the second semantic model by instantiating a network resource identifier to each interaction pattern.

The remaining act of d) deploying the second semantic model within one of the devices is straightforward: The Overflow Protection Recipe Instance may be directly executed on any device that has an embedded runtime environment providing reasoning capabilities.

In the following embodiment, a method of discovering a Thing Recipe is described. When a user wants to instantiate an application from an existing recipe, the first act is to discover the right recipe. The process of discovery is again detailed by referring to the exemplary application according to FIG. 1.

In one embodiment, all semantic information including Thing Descriptions, Thing Recipes, Ingredients and the vocabulary contexts is available in a semantic repository with query capabilities for using a semantic query language for databases (e.g., SPARQL (»SPARQL Protocol And RDF Query Language«)).

The following code shows an example query that may be used to discover Thing Recipes based on their types or categories (e.g., to find a recipe that has annotations including »industryAutomatiom« and »protectionService«).

```
prefix td:   <http://www.w3c.org/wot/td#>
DESCRIBE ?recipe
WHERE {
?recipe a <http://localhost:3030/newRecipes/industryAutomation> ;
    a <http://localhost:3030/newRecipes/protectionService>
}
```

According to an alternative embodiment, a Thing Recipe is discovered based on ingredients. This query allows for searching a Thing Recipe that »does something« with Ingredients: »overflowEvent«, »pneumaticValveOpenStatusProperty«, and »openPneumaticValveAction«. The following code shows an exemplary query.

```
prefix td:   <http://www.w3c.org/wot/td#>
prefix trm: <http://example.org/thingRecipeModel#>
prefix interactions: <http://www.example.com/interactions#>
DESCRIBE ?recipe
WHERE {
    ?recipe trm:hasIngredients ?ingredients .
    ?ingredients trm:ThingIngredients ?_b .
    ?_b a interactions:openPneumaticValveAction .
```

```
    ?ingredients trm:ThingIngredients ?_b_1 .
    ?_b_1 a interactions:pneumaticValveOpenStatusProperty .
    ?recipe trm:hasIngredients ?ingredients_2 .
    ?ingredients_2 trm:ThingIngredients ?_b_2 .
    ?_b_2 a interactions:overflowEvent .
}
```

Using these two queries above or similar variants, a discovery of a Thing Recipe of interest is possible. With respect to the example application, the discovered Thing Recipe as a result of the query would be the Overflow Protection Service Recipe provided above.

While the preceding section has detailed a query for discovering a Thing Recipe, or formally, the »second semantic model«, the following section provides a method for discovering a Thing Description, or formally, the »first semantic model«.

Once a user has discovered a desired Thing Recipe, the user is subsequently to discover Thing Descriptions being »ingredients« of the Thing Recipe prior to proceeding with the implementation of the Thing Recipe.

It is known by the already discovered Thing Recipe (see the previous section) that the exemplary application uses two devices or Things (e.g., the ultrasonic sensor B101 and the pneumatic valve S115) that are digitally described by the respective Thing Description. The relationship between the physical device and the corresponding digital or semantic description by a Thing Description is sometimes referred to as »Digital Shadow«.

Figure 4:
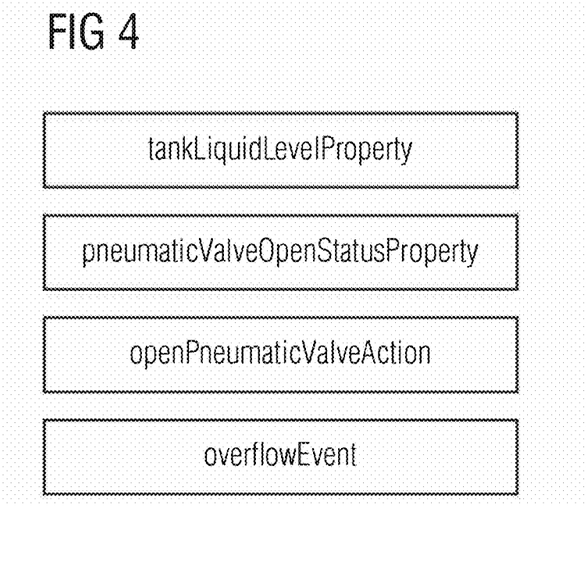
FIG. 4 shows a graphical representation of exemplary Interaction Pattern Types.

The Thing Recipe also grants knowledge of what ingredients the Thing Recipe requires along with corresponding semantics. Consulting the specification of the Interaction Pattern Types, it is known that »tankLiquidLevel« is a Property, which is illustrated by FIG. 4. Accordingly, the two Things to be discovered for the Thing Recipe may be graphically represented as in FIG. 5.

FIG. 5 shows the ultrasonic sensor B101 with a Property tankLiquidLevel and an offered event overflowEvent, and the pneumatic valve S115 with an offered event pneumaticValveOpenStatus and an action openPneumaticValve.

An example query that retrieves two Things candidates to implement the Thing Recipe for the exemplary application is shown below.

```
PREFIX td: <http://www.w3c.org/wot/td#>
PREFIX quantity: <http://purl.oclc.org/NET/ssnx/qu/quantity#>
PREFIX dogont: <http://elite.polito.it/ontologies/dogont.owl#>
PREFIX schema: <http://schema.org/>
PREFIX td: <http://www.w3c.org/wot/td#>
PREFIX quantity: <http://purl.oclc.org/NET/ssnx/qu/quantity#>
PREFIX dogont: <http://elite.polito.it/ontologies/dogont.owl#>
PREFIX schema: <http://schema.org/>
PREFIX saref: <https://w3id.org/saref#>
PREFIX eclass: <http://www.ebusiness-unibw.org/ontologies/eclass/5.1.4/#>
PREFIX ssn: <http://purl.oclc.org/NET/ssnx/ssn#>
DESCRIBE ?td1 ?td2
WHERE {
    ?td1 td:hasAction ?e ;
        td:associatedUri ?_uri1 ;
        ssn:onPlatform ?x.
    ?e a <http://www.example.com/interactions/openPneumaticValveAction> .
```

```
    ?td1 td:hasProperty ?p ;
        ssn:onPlatform ?x .
    ?p a    <http://www.example.com/interactions/pneumaticValveOpenStatusProperty> .
    ?td2 td:hasEvent ?e1 ;
        td:associatedUri ?__uri2 ;
        ssn:onPlatform ?x .
    ?e1 a <http://www.example.com/interactions/overflowEvent> .
    FILTER(?__uri1 != ?__uri2)
}
```

This query is generally capable for a discovery of Thing Descriptions matching the Thing Ingredients and non-functional properties or NFP of a Thing Recipe.

The query will retrieve pairs of Things such that one Thing has ingredients: »openPneumaticValveActiom« and »pneumaticValveOpenStatusProperty«, and another one has »overflowEvent«, see FIG. 5.

Both Things are to be on the same platform, which is expressed by ssn:onPlatform ?x The location on the site is a non-functional property or NFP. The variable ?x may be constrained to be »Tank 102«. Details of these NFP queries, however, are omitted for the sake of generality of the query.

In summary, the present embodiments relate to a method for composing an application using a plurality of distributed interaction patterns including services, events, actions and properties. A second semantic model or Thing Recipe is provided as a basis for representing the application. This Thing Recipe provides a concept for orchestration or choreography of interaction patterns distributed across a network. The process from a specification of the Thing Recipe to deployment is considerably shorter than the implementation and orchestration of web service. The Thing Recipe is not only interpretable but also executable. The semantic approach of the Thing Recipe enables a formal representation capable of a machine-based discovery of the application functionality and, at the same time, a machine interpretation and execution. This provides that a Thing Recipe may be directly executed in any device that has an embedded runtime with reasoning capabilities.

Semantics play the key role in the concept of the Thing Recipes with the following benefits:

Semantic Discovery: Semantic model for the Thing Recipes enable discovery of several equivalent Things (possibly from different Things providers), which may be used to implement recipes.

Re-usability: By modeling an added-value service as a composition of Things' offerings enables re-usability, as Things' offerings will be discoverable and usable for many recipes.

Modularity of Things' offerings: For a Thing's offering to be reusable, the Thing is to be modular. Thus, recipes enforce the modular description of Things' offerings.

Replacability of Things' offerings: In case a Thing's offering is not available anymore, semantic description of the recipe may be used to replace the offering with an equivalent available offering.

Interoperability of Thing Recipes: Thing Recipes are built out of standardized and semantically described ingredients. Thus, interoperability is enhanced.

Efficiency: As the use of Things in the Thing Recipe is not fixed or hard-coded, a user may choose the cheapest and highest quality available Things' offerings in order to run a recipe.

Higher revenue: Usage of Things' offerings in multiple recipes enhances the revenue for the Thing provider.

Competition among Thing providers: The recipes invoke competition among the Thing providers to provide more attractive offerings required for the existing or new recipes.

Seamless access to variety of complex services to end-users: Semantic modeling of the recipes provides seamless access to complex services by enabling semantic based discovery and connectivity to the services.

Machine interpretability of recipes: Thing Recipes are fully interpretable by machines. Thus, intelligent machines as consumer and implementers of recipes are enabled.

Long tail market: Thing Recipes enable quicker and cheaper implementations of IoT applications. This may open the log tail market for applications that so far were cost ineffective.

The elements and features recited in the appended claims may be combined in different ways to produce new claims that likewise fall within the scope of the present invention. Thus, whereas the dependent claims appended below depend from only a single independent or dependent claim, these dependent claims may, alternatively, be made to depend in the alternative from any preceding or following claim, whether independent or dependent. Such new combinations are to be understood as forming a part of the present specification.

While the present invention has been described above by reference to various embodiments, many changes and modifications may be made to the described embodiments. The foregoing description may be regarded as illustrative rather than limiting, and all equivalents and/or combinations of embodiments are intended to be included in this description.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for composing an application using a plurality of distributed interaction patterns assigned to at least one device and accessible over a network, the method comprising:
   using at least one first semantic model, each of the at least one first semantic model semantically representing interaction patterns of a respective device of the at least one device;
   providing a second semantic model, the second semantic model formalizing composed interactions by semantically describing interaction pattern types, the interaction pattern types being an instance of at least one of the interaction patterns;
   implementing the second semantic model, the implementing of the second semantic model comprising instantiating a network resource identifier to each of the interaction patterns; and
   deploying the second semantic model within one device of the at least one device.

2. The method of claim 1, wherein the second semantic model specifies configuration attributes for at least one of the interaction patterns.

3. The method of claim 2, wherein the second semantic model includes at least one Thing Ingredient defining thing to-thing interactions.

4. The method of claim 3, wherein the thing-to-thing interactions include an action, a property, an event offered by the device, or any combination thereof.

5. The method of claim 4, wherein providing the second semantic model is preceded by a semantic based discovery of resources offered by the first semantic model, the second semantic model, or the first semantic model and the second semantic model.

6. The method of claim 5, wherein the semantic based discovery is supported by a semantic repository.

7. The method of claim 2, wherein the second semantic model includes at least one Thing Ingredient defining thing-to-thing interactions, and
   wherein the thing-to-thing interactions include an action, a property, an event offered by the device, or any combination thereof.

8. The method of claim 2, wherein the second semantic mode includes a definition of non-functional properties, Quality-of-Service parameters, or a combination thereof.

9. The method one of claim 1, wherein the second semantic model includes at least one Thing Ingredient defining thing-to-thing interactions.

10. The method of claim 9, wherein the thing-to-thing interactions include an action, a property, an event offered by the device, or any combination thereof.

11. The method of claim 10, wherein the second semantic mode includes a definition of non-functional properties, Quality-of-Service parameters, or a combination thereof.

12. The method of claim 9, wherein the second semantic mode includes a definition of non-functional properties, Quality-of-Service parameters, or a combination thereof.

13. The method of claim 1, wherein the second semantic mode includes a definition of non-functional properties, Quality-of-Service parameters, or a combination thereof.

14. The method of claim 1, wherein providing the second semantic model is preceded by a semantic based discovery of resources offered by the first semantic model, the second semantic model, or the first semantic model and the second semantic model.

15. The method of claim 14, wherein the semantic based discovery is supported by a semantic repository.

* * * * *